US012567628B2

(12) United States Patent
Cao et al.

(10) Patent No.: US 12,567,628 B2
(45) Date of Patent: Mar. 3, 2026

(54) TOP COVER FOR POWER BATTERY, AND POWER BATTERY

(71) Applicants: REPT Battero Energy Co., Ltd., Wenzhou (CN); Shanghai Ruipu Energy Co., Ltd., Shanghai (CN)

(72) Inventors: Hui Cao, Zhejiang (CN); Xianfeng Yu, Zhejiang (CN); Min Hou, Shanghai (CN); Chan Liu, Shanghai (CN); Peng Hu, Zhejiang (CN); Yunlong Cai, Zhejiang (CN); Zhaoyu Yu, Zhejiang (CN)

(73) Assignees: REPT BATTERO Energy Co., Ltd., Wenzhou (CN); Shanghai Ruipu Energy Co., Ltd., Shanghai (CN)

( * ) Notice: Subject to any disclaimer, the term of this patent is extended or adjusted under 35 U.S.C. 154(b) by 816 days.

(21) Appl. No.: 17/788,564

(22) PCT Filed: Dec. 24, 2020

(86) PCT No.: PCT/CN2020/139014
§ 371 (c)(1),
(2) Date: Jun. 23, 2022

(87) PCT Pub. No.: WO2021/129739
PCT Pub. Date: Jul. 1, 2021

(65) Prior Publication Data
US 2022/0359937 A1        Nov. 10, 2022

(30) Foreign Application Priority Data

Dec. 24, 2019    (CN) ......................... 201911346498.6
Dec. 24, 2019    (CN) ......................... 201922344555.9

Jul. 21, 2020    (CN) ......................... 202021438092.9

(51) Int. Cl.
H01M 50/15        (2021.01)
H01M 50/176        (2021.01)

(52) U.S. Cl.
CPC ......... H01M 50/15 (2021.01); H01M 50/176 (2021.01)

(58) Field of Classification Search
CPC ............... H01M 50/15; H01M 50/176; H01M 50/3425; H01M 50/188; H01M 50/557;
(Continued)

(56) References Cited

U.S. PATENT DOCUMENTS

2012/0058390 A1    3/2012    Obayashi et al.
2015/0037662 A1    2/2015    Pinon et al.
(Continued)

FOREIGN PATENT DOCUMENTS

CN        205657096 U    10/2016
CN        207183329    *    4/2018    .............. H01M 2/04
(Continued)

OTHER PUBLICATIONS

JP 2018-081780 machine English translation (Year: 2018).*
(Continued)

*Primary Examiner* — Michael L Dignan
(74) *Attorney, Agent, or Firm* — Quarles & Brady LLP

(57) ABSTRACT

A top cover for a power battery including a top cover plate, a first post, a first fastener, a second post, a first sealing member, and an insulation plate.

21 Claims, 17 Drawing Sheets

(58) Field of Classification Search

CPC ............. H01M 50/566; H01M 50/586; H01M 50/593; Y02E 60/10

See application file for complete search history.

(56) References Cited

U.S. PATENT DOCUMENTS

| | | | |
|---|---|---|---|
| 2015/0086857 A1 | 3/2015 | Moon et al. | |
| 2015/0118547 A1* | 4/2015 | Dewulf | H01M 50/543 429/179 |
| 2020/0358071 A1* | 11/2020 | Kawanishi | H01M 50/562 |
| 2021/0234219 A1* | 7/2021 | Liang | H01M 50/176 |

FOREIGN PATENT DOCUMENTS

| | | | | |
|---|---|---|---|---|
| CN | 207183329 U | | 4/2018 | |
| CN | 208208806 | * | 12/2018 | H01M 2/04 |
| CN | 208208806 U | | 12/2018 | |
| CN | 110224104 A | | 9/2019 | |
| CN | 110581307 A | | 12/2019 | |
| CN | 110854308 A | | 2/2020 | |
| CN | 211376681 U | | 8/2020 | |
| CN | 211455733 U | | 9/2020 | |
| CN | 212062562 U | | 12/2020 | |
| CN | 216288678 U | | 4/2022 | |
| JP | S634548 A | | 1/1988 | |
| JP | 2012059365 A | | 3/2012 | |
| JP | 2015065149 A | | 4/2015 | |
| JP | 2015518254 A | | 6/2015 | |
| JP | 2018-081780 | * | 5/2018 | H01M 2/04 |
| JP | 2018081780 A | | 5/2018 | |
| JP | 2018139190 A | | 9/2018 | |
| WO | WO 2017/198136 | * | 11/2017 | H01M 2/04 |
| WO | 2019134700 A1 | | 7/2019 | |
| WO | 2019227460 A1 | | 12/2019 | |

OTHER PUBLICATIONS

WO 2017/198136 machine English translation (Year: 2017).*

CN 208208806 machine English translation (Year: 2018).*

CN 207183329 machine English translation (Year: 2018).*

Japan Patent Office, Notice of Reasons for Refusal, Application No. 2022-508893, Mar. 28, 2023, 4 pages.

European Patent Office, Extended European Search Report, Application No. 20904663.0, Nov. 27, 2024, 8 pages.

Indonesian Patent Office, Office Action, Application No. P00202207687, Oct. 16, 2023, 4 pages.

Japanese Patent Office, Notice of Reasons for Refusal, Application No. 2022-508893, Sep. 22, 2023, 4 pages.

Intellectual Property India, Examination Report, Application No. 202217039861, Nov. 30, 2022, 6 pages.

PCT International Search Report and Written Opinion and translation thereof, PCT/CN2020/139014, Mar. 25, 2021, 16 pages.

China National Intellectual Propery Administration, First Office Action and Search Report, Application No. 201911346498.6, Nov. 15, 2024, 14 pages [English Translation of Office Action Only].

* cited by examiner

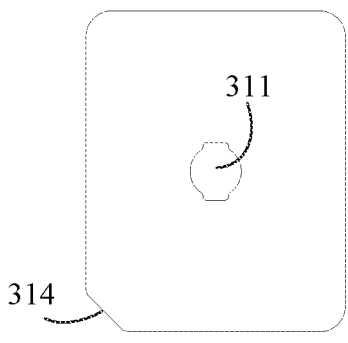
FIG. 10A
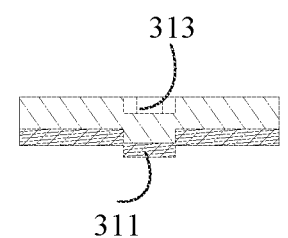
FIG. 10B
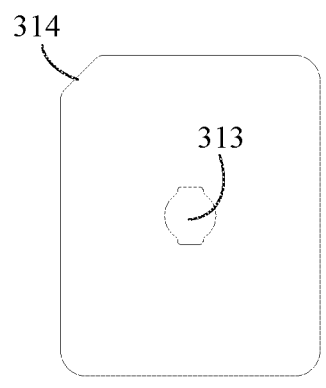
FIG. 10C
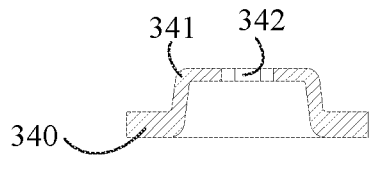
FIG. 11A
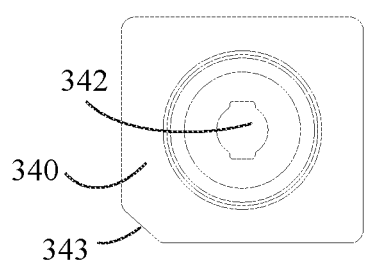
FIG. 11B
FIG. 11C

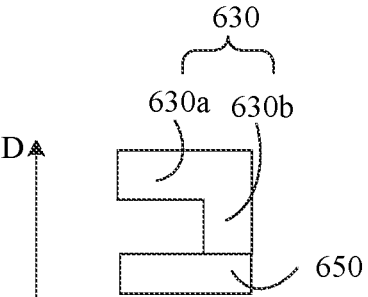
F I G. 18A
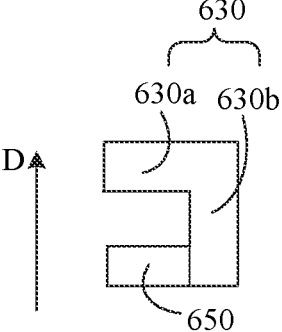
F I G. 18B

300、700

200、600     100、1600

1901

1900

TOP COVER FOR POWER BATTERY, AND POWER BATTERY

CROSS-REFERENCE TO RELATED APPLICATIONS

This application represents the U.S. national stage entry of International Application No. PCT/CN2020/139014 filed Dec. 24, 2020, which claims priority to Chinese Patent Application No. 201922344555.9 filed Dec. 24, 2019, Chinese Patent Application No. 201911346498.6 filed Dec. 24, 2019, and Chinese Patent Application No. 202021438092.9 filed Jul. 21, 2020, the disclosure of which is incorporated herein by reference in its entirety and for all purposes.

TECHNICAL FIELD

The invention relates to the field of power batteries, in particular to a top cover for a power battery and a power battery.

BACKGROUND

The power battery can provide sufficient power for an electric equipment. Power batteries, such as lithium-ion batteries, have already played a role in products such as new energy vehicles. At present, top cover structure of power batteries includes a polar pole post (simply "post" for short in below context), a sealing ring, etc., involving an injection-molded structure, a riveting structure, and a welding structure, etc. On one hand, such a top cover structure is complicated in its structure and in processing technology, and there also requires huge processing equipment, and high material and processing costs. On the other hand, in riveted structures, it may cause problems of poor sealing and poor insulation; in injection-molded structure, it may cause problems of poor sealing ring compression due to the inconsistency of the force generated by the injection molding and the direction of the compression force of the sealing ring; in welding structure, the force required to compress the sealing ring is indirectly transmitted to the post through the welding ring, and then to the sealing ring, which easily causes poor compression of the sealing ring, resulting in poor sealing of the post. In addition, the posts of the existing top cover structure of a power battery occupy too much space inside and outside the power battery, reducing the capacity density of the power battery, and the solid post structure also increases the weight of the power battery.

SUMMARY

The technical problem to be solved by the present invention is to provide a top cover of a power battery with a simplified structure, low cost, low weight, and good sealing performance, and a power battery including such power battery top cover.

To solve the technical problems as stated above, the present invention proposes a top cover for a power battery, comprising: a top cover plate, comprising a recessed platform for a post and a post hole, the recessed platform for a post being provided in a first surface of the top cover plate in a depressed manner, and the post hole being located in the recessed platform for a post hole; a first post, comprising a first post protrusion passing through the post hole; a first fastener, comprising a first fastener through hole, the first post being partially disposed within the first fastener through hole, and the first fastener being partially disposed within the recessed platform; a second post, comprising a second post protrusion, the second post protrusion comprising a protrusion hole, the first post protrusion extending into the protrusion hole, and the first post being in electrical contact with the second post; a first sealing member, disposed within the recessed platform and being in contact with the first post; and an insulation plate, comprising an insulation plate through hole and provided at a side of a second surface of the top cover plate, the second surface being a reverse side surface of the first surface, and the second post protrusion passing through the insulation plate through hole and being in electrical contact with the first post.

To solve the technical problems as stated above, the present invention also proposes a power battery, comprising a top cover for a power battery as stated above.

In the top cover for a power battery of the present invention, the first post protrusion of the first post extends into the protrusion hole of the second post, and the first post and the first fastener are connected by a groove and a bulge, which simplifies the structure of the post assembly, reducing the height space occupied by the post assembly inside and outside the power battery, and improving the utilization rate of the space inside and outside the power battery. The top cover for a power battery of the present invention adopts a first sealing member and a second sealing member to form a double sealing structure for the post assembly, which greatly improves the reliability of the post sealing; and the first post and the second post are connected by welding, the force generated during the welding process is directly transmitted to the first sealing member and the second sealing member, and the welding force is consistent with the direction of the compressive force of the first sealing member and the second sealing member, which is helpful for the compression of the first sealing member and the second sealing member, resulting in further enhancement of sealing performance of the post. The top cover for a power battery has good sealing, pressure resistance and high temperature resistance. The power battery including the top cover has good sealing performance, pressure resistance and high temperature resistance, which enables the power battery safe and reliable.

BRIEF DESCRIPTION OF THE DRAWINGS

The features and performance of the present invention are further described by the following embodiments and accompanying drawings.

FIGS. 10A-10C are schematic diagrams of the shape of the first post 310 of the top cover for a power battery according to another embodiment of the present invention;

FIGS. 11A-11C are schematic diagrams of the shape of the second post 340 of the top cover for a power battery according to another embodiment of the present invention;

FIGS. 18A-18D are four embodiments of the first sealing member and the second sealing member of the top cover for a power battery of the present invention;

PREFERRED EMBODIMENT OF THE PRESENT INVENTION

The present invention proposes a top cover for a power battery, comprising: a top cover plate, comprising a recessed platform for a post and a post hole, the recessed platform for a post being provided in a first surface of the top cover plate in a depressed manner, and the post hole being located in the recessed platform for a post hole; a first post, comprising a first post protrusion passing through the post hole; a first fastener, comprising a first fastener through hole, the first post being partially disposed within the first fastener through hole, and the first fastener being partially disposed within the recessed platform; a second post, comprising a second post protrusion, the second post protrusion comprising a protrusion hole, the first post protrusion extending into the protrusion hole, and the first post being in electrical contact with the second post; a first sealing member, disposed within the recessed platform and being in contact with the first post; and an insulation plate, comprising an insulation plate through hole and provided at a side of a second surface of the top cover plate, the second surface being a reverse side surface of the first surface, and the second post protrusion passing through the insulation plate through hole and being in electrical contact with the first post.

Wherein, the first post, the first fastener, the second post and the first sealing member may constitute a post assembly of a power battery, which is used to form the electrode of a power battery. The present invention does not limit the number of electrodes of the power battery. It can be understood that the number of post assemblies corresponds to the number of electrodes of a power battery. Typically, a power battery includes two electrodes, which are a positive electrode and a negative electrode. The post assembly in the embodiment of the present invention can be used as a positive electrode or a negative electrode of a power battery. The drawings in this specification will be described using a top cover for a power battery with two electrodes as an example. In such embodiment, the top cover for a power battery includes two sets of post assemblies arranged symmetrically.

Figure 1A:
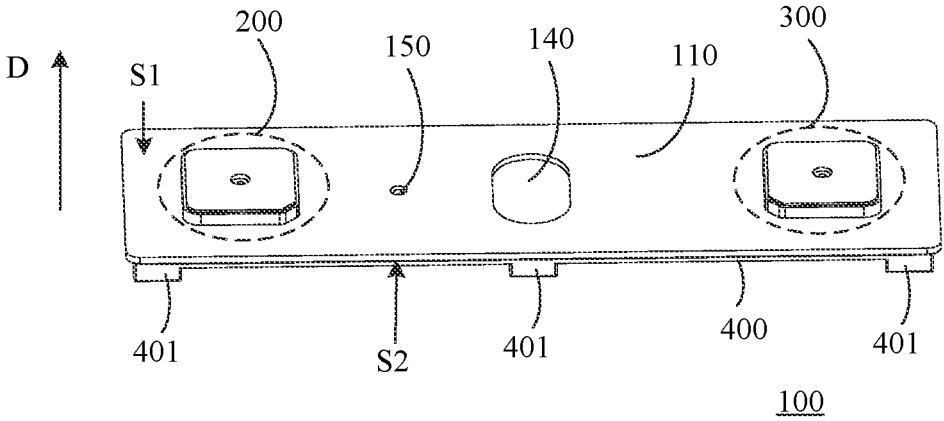
FIG. 1A is a schematic diagram of the three-dimensional structure of a top cover for a power battery according to an embodiment of the present invention.
Figure 1B:
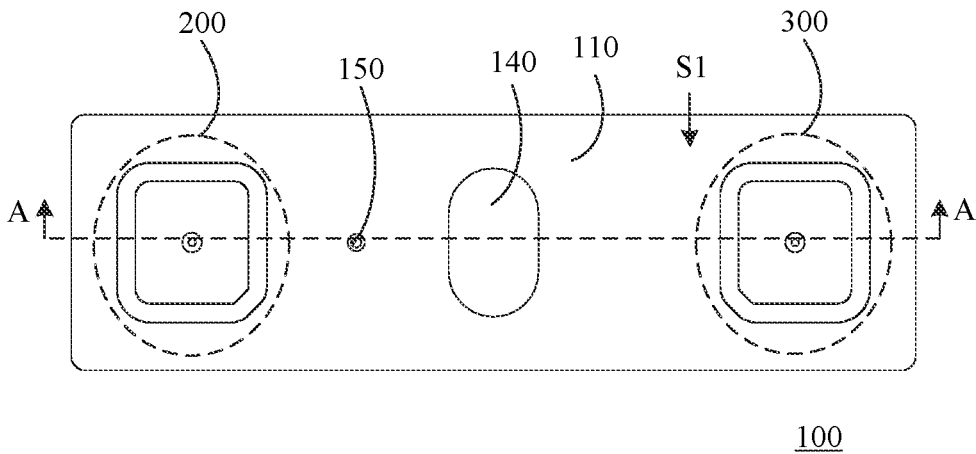
FIG. 1B is a schematic top view of a top cover for a power battery according to an embodiment of the present invention.

FIG. 1A is a schematic three-dimensional structural diagram of a top cover for a power battery (or indicate as "power battery top cover" in below context) according to an embodiment of the present invention. FIG. 1B is a schematic top view of a top cover for a power battery according to an embodiment of the present invention. Referring to FIGS. 1A and 1B, the power battery top cover 100 includes a top cover plate 110, two post assemblies 200, 300 and an insulation plate 400. Each post assembly includes a set of first post, first fastener, second post and first sealing member (not shown in the figures). The specific structures of the post assemblies 200 and 300 will be developed in the following in conjunction with other drawings.

Referring to FIG. 1A, the top cover plate 110 of the power battery top cover 100 is a rectangular plate-like structure. In actual use, it is placed in direction D as indicated, and the first surface S1 of the top cover plate 110 is located on the top or so called the front surface, the second surface S2 of the top cover plate 120 is located below or so called the bottom surface, and the second surface S2 is the reverse surface of the first surface S1.

Referring to FIG. 1A, the insulation plate 400 is located on the side of the second surface S2 of the top cover plate 110. The insulation plate 400 is a plate-like structure adapted to the shape and size of the top cover plate 110. There are three connecting parts 401 on the bottom surface of second surface S2 of the insulation plate 400 away from the top cover plate 110, which are configured to assemble the power battery top cover 100 to other components in the power battery located below the power battery top cover, such as the battery body.

Referring to FIGS. 1A and 1B, in some embodiments, the top cover plate 110 further includes explosion-proof installation hole 140 for installing explosion-proof components; the top cover plate 110 further includes a liquid injection hole 150 through which liquid can be injected into the battery, and the liquid injection hole 150 can be sealed after the injection.

FIGS. 1A and 1B are not used to limit the specific size and shape of the top cover plate 110 of the power battery top cover 100; neither the size, shape and the specific position on the top cover plate 110 of post assemblies 200 and 300, explosion-proof installation hole 140 and liquid injection hole 150 are limited; the specific shape and quantity of the connecting parts 401 is not limited neither.

Figure 2:
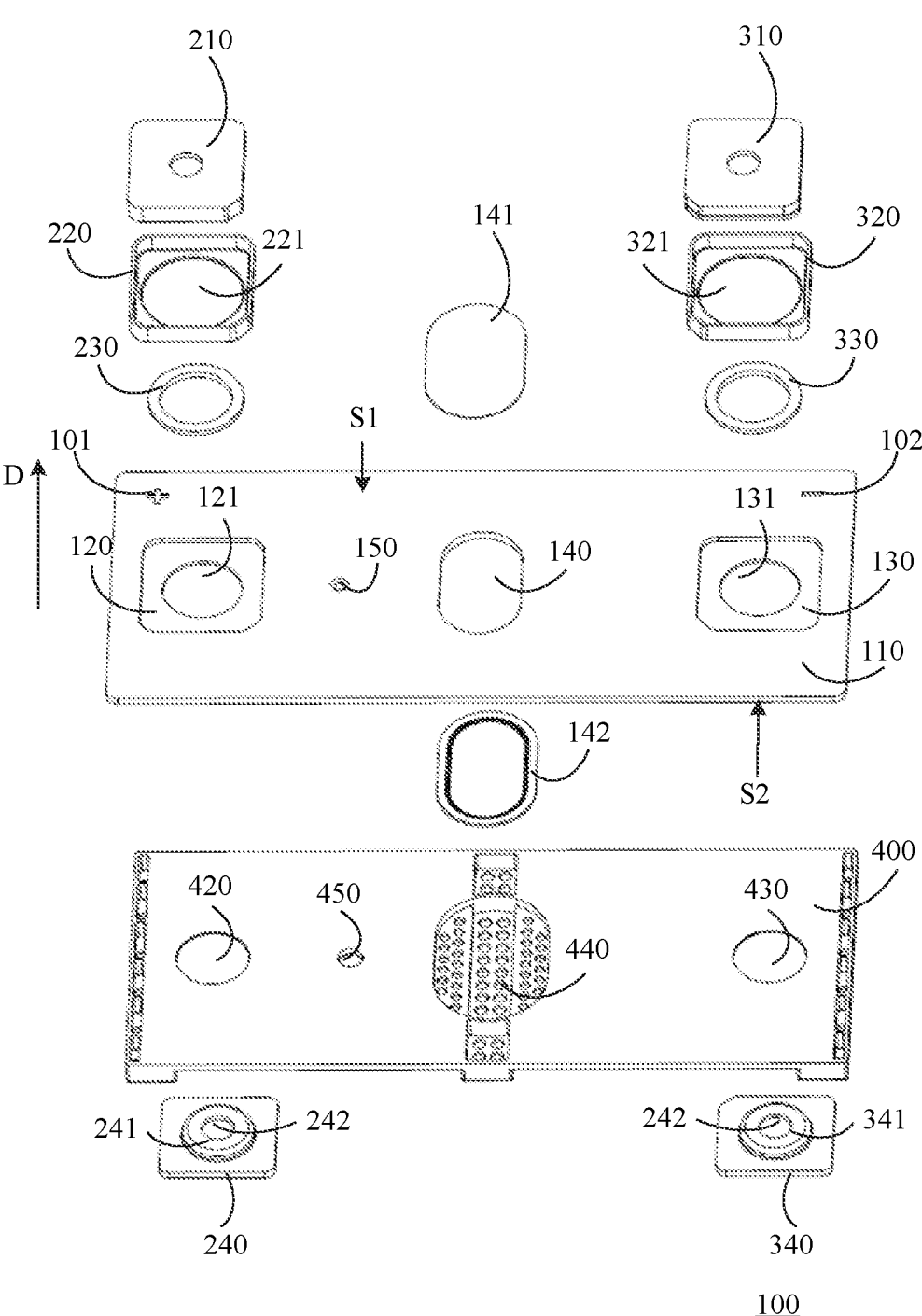
FIG. 2 is an exploded schematic diagram of a top cover for a power battery according to an embodiment of the present invention.

FIG. 2 is an exploded schematic diagram of a top cover for a power battery according to an embodiment of the present invention. FIG. 2 is an exploded view of the power battery top cover 100 corresponding to the embodiment shown in FIGS. 1A and 1B, wherein the components of the post assemblies 200 and 300, the specific components of the top cover plate 110 and the insulation plate 400 are showed.

Referring to FIG. 2, the top cover plate 110 in the power battery top cover 100 includes post recessed platforms 120 and 130 (or known as "recessed platform for a post" in this context) and post holes 121 and 131. The post hole 121 is located in the post recessed platform 120 and the post hole 131 is located in the post recessed platform 130. The post recessed platforms 120 and 130 are located in the first surface S1 of the top cover plate 110 in a depressed manner, that is to say, the post recessed platforms 120 and 130 are located in the top cover plate 110 in a recessed manner relative to the first surface S1. The post recessed platforms 120, 130 and the first surface S1 form a step shape with a certain height, and the height of the step is also the subsidence height of post recessed platforms 120 and 130 by reference to the top cover plate 110. The post recessed platforms 120 and 130 are used to install the post assemblies 200 and 300. The post recessed platforms 120 and 130 can also be called as installation grooves, the post holes 121 and 131 are arranged at the bottom of the installation grooves. The post holes 121, 131 may also be referred to as mounting through holes.

Referring to FIG. 2, the first post 210, the first fastener 220, the second post 240 and the first sealing member 230 constitute the post assembly 200 described above; the first post 310 and the first fastener 320, the second post 340 and the first sealing member 330 constitute the post assembly 300 described above. The post assemblies 200 and 300 are used to electrically connect the power battery with external devices. As shown in FIG. 2, in some embodiments, the first surface S1 of the top cover plate 110 may further include electrode indication marks 101 and 102, wherein the electrode indication mark 101 is "+", indicating the post assembly 200 nearby is connected to the positive electrode tab of the cell of the power battery; and the electrode indication sign 102 is "−", indicating that the post assembly 300 nearby is connected to the negative electrode tab of the cell of the power battery. Specifically, the second post 240 is connected to the positive electrode tab of the cell through a type of connecting plate, and the second post 340 is connected to the negative electrode tab of the battery through another type of connecting plate, so as to realize the electrical connection between the battery and external devices.

Referring to FIG. 2, the post recessed platform 120 and the post hole 121 cooperate with the post assembly 200 to form one electrode of the power battery, and the post recessed platform 130 and the post hole 131 cooperate with the post assembly 300 to form another electrode of the power battery.

In some embodiments, the post recessed platform 120 and the post recessed platform 130 have the same shape and size, and are symmetrically disposed in the top cover plate 110.

In some embodiments, the post recessed platform 120 and the post recessed platform 130 are different in their shape and size.

In some embodiments, the post recessed platform 120 and the post recessed platform 130 are asymmetrically disposed in the top cover plate 110.

In some embodiments, the post hole 121 and the post hole 131 have the same shape and size, and the relative positions of the post hole 121 and the post hole 131 in the post recessed platform 120 and the post recessed platform 130 are also the same.

In some embodiments, the post hole 121 and the post hole 131 are different in their shape and size.

In some embodiments, the relative positions of the post hole 121 and the post hole 131 in the post recessed platform 120 and the post recessed platform 130 are different, respectively.

The size, shape and position of the post recessed platform and the post hole should correspond to the size and shape of the corresponding post assembly.

Since the main structures of the post assemblies 200 and 300 are the same, the post recessed platform 120, the post hole 121 and the post assembly 200 will be used as examples for description below, and the differences between the post assemblies 200 and 300 will be particularly pointed out.

Referring to FIG. 2, the first post 210 includes a first post protrusion (not shown in the figure), and the first post protrusion passes through the post hole 121 on the top cover plate 110. From the viewing angle as shown in FIG. 2, the first post protrusion is disposed in a bulgy way on the lower surface of the first post 210.

The first fastener 220 includes a first fastener through hole 221, the first post 210 is partially disposed in the first fastener through hole 221, and the first fastener 220 is partially disposed in the post recessed platform 120.

The second post 240 includes a second post protrusion 241, the second post protrusion 241 includes a post protrusion hole 242. In the assembled power battery top cover 100, the first protrusion protrudes into the protrusion hole 242, and the first post 210 and the second post 240 are in electrical contact. The shapes of the first post protrusion and the protrusion hole 242 are matched or the same.

The first sealing member 230 is disposed in the post recessed platform 120 and is in contact with the first post 210.

The insulation plate 400 includes insulation plate through holes 420 and 430, wherein the insulation plate through hole 420 corresponds to the post assembly 200, and the insulation plate through hole 430 corresponds to the post assembly 300. Taking the insulation plate through hole 420 as an example, the position, size and shape of the insulation plate through hole 420 on the insulation plate 400 should be compatible with the post hole 121, the first post protrusion, and the second post protrusion 241, so that the second post protrusion 241 is electrically connected to the first post 210 through the insulation plate through hole 420. The insulation plate 400 is disposed on the side of the second surface S2 of the top cover plate 110.

Referring to FIG. 2, the insulation plate 400 further includes an explosion-proof valve hole 440 and a liquid injection hole 450. The shape, size and position of the explosion-proof valve hole 440 correspond to the explosion-proof installation hole 140 on the top cover plate 110.

In some embodiments, the power battery top cover 100 further includes a protection patch 141 and a rupture disc 142. The explosion-proof installation hole 140, the protection patch 141, the rupture disc 142 and the explosion-proof valve hole 440 together constitute an explosion-proof valve assembly. The rupture disc 142 and the explosion-proof installation hole 140 are assembled and sealed by welding. The protection patch 141 is attached to the top cover plate 110 to seal the explosion-proof assembly. The explosion-proof valve hole 440 covers the rupture disc 142 from the direction toward the second surface S2, so as to protect the explosion-proof valve assembly.

In some embodiments, the material of the protection patch 141 is PET or other plastic materials, and the material of the rupture disc 142 is aluminum material or aluminum alloy material.

Referring to FIG. 2, the shape, size and position of the liquid injection hole 450 correspond to the liquid injection hole 150 on the top cover plate 110. The shape and size of the liquid injection hole 450 may be different from those of the liquid injection hole 150, as long as the liquid injection hole 150 and the liquid injection hole 450 can be used to inject liquid into the battery.

In some embodiments, the liquid injection hole 450 is a supporting through-hole structure, which is beneficial for the electrolyte to quickly infiltrate inside the battery after injection.

In some embodiments, the insulation plate 400 is made of PP or other plastic materials with good corrosion resistance and high temperature resistance. The insulation plate 400 can be integrally formed with a plastic material, and is disposed below the top cover plate 110, so the insulation plate 400 can also be referred to as an integrated lower plastic.

Figure 3A:
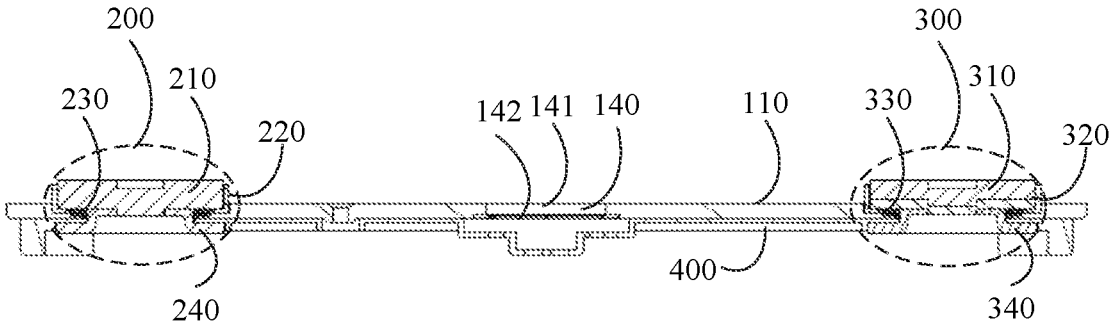
FIGS. 3A-3C are schematic cross-sectional views of a top cover for a power battery according to an embodiment of the present invention.
Figure 3B:
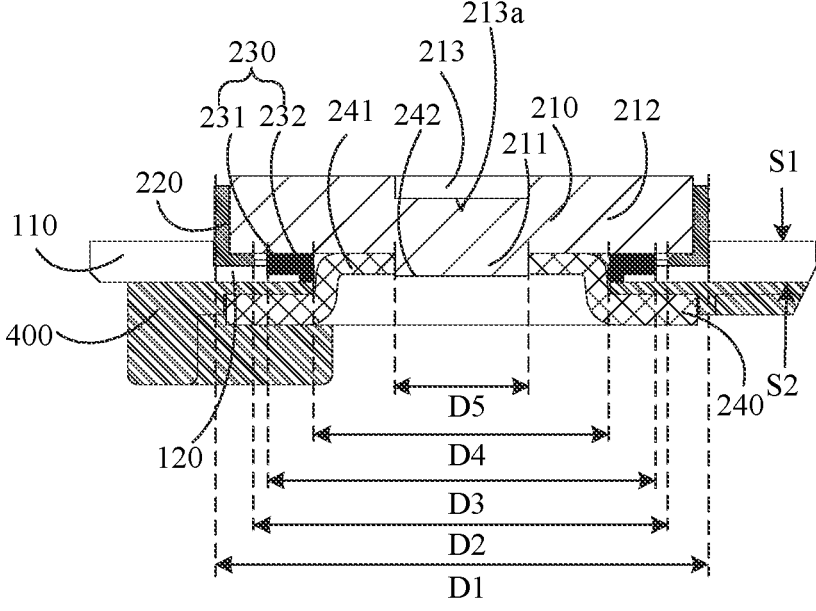
Figure 3C:
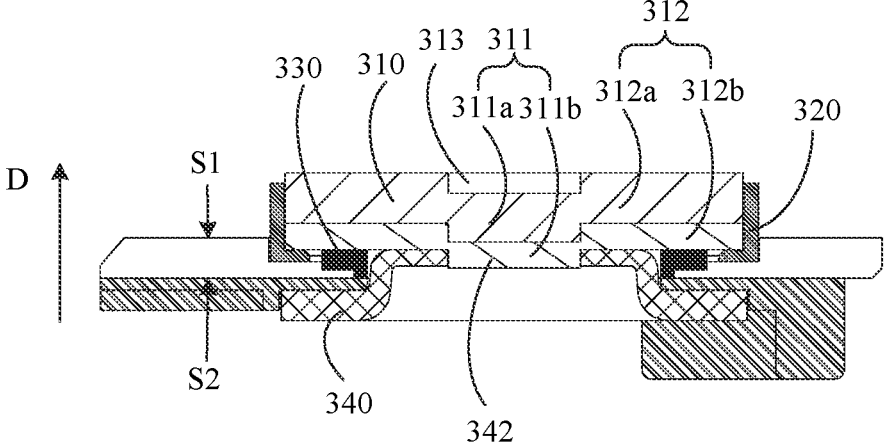

FIGS. 3A-3C are schematic cross-sectional views of a power battery top cover according to an embodiment of the present invention. FIGS. 3A-3C are cross-sectional views taken along line AA' as shown in FIG. 2. FIG. 3A is a schematic cross-sectional view of the power battery top cover 100 shown in FIGS. 1-3, which includes a top cover plate 110, post assemblies 200, 300 and an insulation plate 400. The post assembly 200 includes a first post 210, a first fastener 220, a second post 240 and a first sealing member 230; the post assembly 300 includes a first post 310, a first fastener 320, the second post 340 and the first sealing member 330. Explosion-proof valve assemblies such as the protection patch 141 and the rupture disc 142 are arranged in the middle of the top cover plate 110, and the post assemblies 200 and 300 are symmetrically arranged at both ends of the top cover plate 110.

FIG. 3B is a partial enlarged schematic view of a part of the structure including the post assembly 200. Referring to FIG. 3B, the first post 210 includes a first post protrusion 211. The part of the first post 210 other than the first post protrusion 211 is called a post body 212. Referring to FIG. 2, the post body 212 is partially disposed in the first fastener through hole 221, and a part of the post body 212 protrudes out of the first fastener through hole 221 along the direction D. The first post protrusion 211 passes through the post hole 121 and protrudes into the protrusion hole 242, and the first post 210 and the second post 240 are in electrical contact through the first post protrusion 211 and the protrusion hole 242. Referring to FIG. 3B, the lower surface of the post body 212 of the first post 210 is also in contact with the upper surface of the second post protrusion 241 of the second post 220, and the first post 210 and the second post 240 are also in electrical contact with the upper surface of the second post protrusion 241 through the lower surface of the post body 212.

Referring to FIG. 3B, the first sealing member 230 is disposed in the post recessed platform 120 and is in contact with the lower surface of the post body 212 of the first post 210.

In some embodiments, the first sealing member 230 includes a first part 231 and a second part 232, the first part 231 is sandwiched between the first post 210 and the post recessed platform 120, and the second part 232 is disposed in the post hole 121; the second part 232 is sandwiched between the post recessed platform 120 and the second post protrusion 241. As shown in FIG. 3B, the upper surface of the first part 231 is in contact with the lower surface of the post body 212, and the lower surface of the first part 231 is in contact with the upper surface of the post recessed platform 120; the upper surface of the second part 232 is also in contact with the lower surface of the post body 212, the outer side of the second part 232 is in contact with the sidewall of the post recessed platform 120 extending downward to the second surface S2, and the inner side of the second part 232 is in full contact, partial contact or no contact to the second post protrusion 241.

In some embodiments, the first part 231 and the second part 232 are L-shaped in their longitudinal section. As shown in FIG. 3B, the first part 231 and the second part 232 have an inverted L shape in the longitudinal section thereof. As the two sides of the L-shape, the first part 231 and the second part 232 may be perpendicular to each other, or may form a certain angle.

In the embodiment shown in FIG. 2, the post recessed platform 120 is square, the outer shape of the first fastener 220 is approximately square, the post hole 121, the first fastener through hole 221, and the second post protrusion 241 and the protrusion hole 242 are circular, and the first sealing member 230 is ring-shaped. The first sealing member 230 may be implemented as a sealing ring. Assuming that the side length of the post recessed platform 120 is D1, the diameter of the first fastener through hole 221 is D2, the diameter of the outer ring of the first sealing member 230 is D3, the diameter of the inner ring of the first sealing member 230 is D4, the diameter of the protrusion hole 242 is D5, then $D1 > D2 > D3 > D4 > D5$.

Referring to FIG. 3B, the first fastener 220 is partially embedded in the post recessed platform 120, and the outer sidewall of the first fastener 220 is in contact with the sidewall of the post recessed platform 120 extending upward to the first surface S1. The upper part of the first fastener 220 protrudes out of the post recessed platform 120 and protrudes from the first surface S1.

In the embodiment shown in FIG. 3B, the first sealing member 230 is of an annular structure, and the annular area of the first sealing member 230 is smaller than the hole area of the first fastener through hole 221. As shown in FIG. 3B, the diameter D3 of the outer ring of the first sealing member 230 is smaller than the diameter D2 of the first fastener through hole 221.

In the embodiment shown in FIG. 3B, the post assembly 200 is used as the positive electrode of the power battery, and the first fastener 220 is a conductive material or an insulation material. When the first fastener 220 is a conductive material, it may be a conductive plastic, and the resistance value is 0-10,000 ohms, and the first fastener 220 and the top cover plate 110 are in a conductive state. When the first fastener 220 is an insulation material, it may be insulation plastic, and the resistance value is greater than 200 megohms, and the first fastener 220 is insulated from the top cover plate 110. When the first fastener 220 is made of plastic material, since it is located above the top cover plate 110, it can be called upper plastic.

In some embodiments, the material of the top cover plate 110 is aluminum material or aluminum alloy material.

In some embodiments, the first post protrusion 211 and the protrusion hole 242 are connected by welding, such as laser welding.

Referring to FIGS. 2 and 3B, when installing the top cover 100 of the power battery, the first sealing member 230 is first placed in the post recessed platform 120, and then the first fastener 220 is installed in the sidewall of the post recessed platform 120 on the top cover 110 extending upward to the first surface S1, and the first post 210 is placed in the post recessed platform 120 and the first fastener through hole 221, so as to contact with the first fastener 220 and the first sealing member 230 closely. The second post 240 then is passed through the insulation plate through hole 420 on the insulation plate 400 and the post hole 121, so that the first post protrusion 211 is in close contact with the protrusion hole 242. Finally, laser welding is used to weld the contact surfaces of the first post protrusion 211 and the protrusion hole 242 together along the gap. In addition, one or more weldings can be added between the contact surfaces of the lower surface of the post body 212 of the first post 210 and the upper surface of the second post protrusion 241 of the second post 240 to realize the fixing and sealing of the post assembly 200.

In some embodiments, when the post assembly 200 is used for the positive electrode of the power battery, the material of the first post 210 and the second post 240 may be aluminum material or aluminum alloy material.

In some embodiments, the material of the first fastener 220 may be a plastic material with good corrosion resistance and high temperature resistance.

In some embodiments, the material of the first sealing member 230 may be a rubber material with certain elasticity.

Referring to FIG. 3B, in some embodiments, a top groove 213 is further included at the top of the first post 210. In this embodiment, the top groove 213 is similar in shape to the first post protrusion 211, and both are circular, and the concave depth of the groove 213 is substantially equal to the protruding height of the first post protrusion 211.

In some embodiments, a riveting hole 213*a* is provided in the top groove 213 for riveting.

In other embodiments, the shapes of the top groove 213 and the first post protrusion 211 may be polygonal, circular, oval, racetrack, or a shape such as rounded corners or keyway deformations are added to these shapes.

Referring to FIG. 3B, in some embodiments, the protrusion hole 242 in the second post 240 has the same shape as the first post protrusion 211.

In some embodiments, the outer shape of the first post 210 may be a polygon, a circle, an ellipse, a racetrack shape, or shapes such as rounded corners or keyway deformations are added to these shapes.

FIG. 3C is a partially enlarged schematic view of a part of the structure including the post assembly 300. Most of the structure of the post assembly 300 is the same as that of the post assembly 200, and the same parts will not be repeated in below context. The difference between the post assembly 300 and the post assembly 200 will be described below with reference to FIG. 3C. As shown in FIG. 3C, the first fastener 320, the second post 340 and the first sealing member 330 are the same as the first fastener 220, the second post 240 and the first sealing member 230, respectively. The first post 310 includes a first post protrusion 311. The part of the first post 310 other than the first post protrusion 311 is called a post body 312. Different from the post body 212, the post body 312 is divided into two parts along the direction D, namely the upper part 312*a* and the lower part 312*b*, and the two parts have protrusion respectively. Therefore, the first post protrusion 311 is divided into two parts as well, namely the upper protrusion 311*a* and the lower protrusion 311*b*. The upper part 312*a* and the lower part 312*b* can be integrally formed, or can be formed by combining two separate parts. The lower protrusion 311*b* extends into the protrusion hole 342 of the second post 340.

In some embodiments, when the post assembly 300 is used for the negative electrode of the power battery, the material of the first post 310 can be a copper-aluminum composite material, wherein the material of the upper part 312*a* can be aluminum or aluminum alloy, and the material of the lower part 312*b* can be copper material or copper alloy material; the material of the second post 340 can be copper material or copper alloy material. The material of the first fastener 320 may be a plastic material with good corrosion resistance and high temperature resistance. The material of the first sealing member 330 may be a rubber material with certain elasticity.

Referring to FIG. 3C, in some embodiments, a top groove 313 is further included at the top of the first post 310. In this embodiment, the top groove 313 is similar in shape to the first post protrusion 311, both are circular, and the concave depth of the groove 313 is substantially equal to the protruding height of the first post protrusion 311.

In other embodiments, the shape of the top groove 313 and the first post protrusion 311 may be polygonal, circular, oval, racetrack, or a shape such as rounded corners or keyway deformations are added to these shapes.

Referring to FIG. 3C, in some embodiments, the protrusion hole 342 in the second post 340 has the same shape as the first post protrusion 311.

In some embodiments, the outer shape of the first post 310 may be a polygon, a circle, an ellipse, a racetrack shape, or shapes such as rounded corners or keyway deformations are added to these shapes.

In some embodiments, the appearance shapes of the first post 210 and the first post 310 may be the same or different. The different advantages are that it can realize error prevention and avoid the reverse installation of the positive and negative electrodes during the process, resulting in battery corrosion. The appearance shapes of the second post 240 and the second post 340 may be the same or different.

In the top cover of the power battery of the present invention, the first post protrusion of the first post is extended into the protrusion hole of the second post, which reduces the height space occupied by the post assembly inside and outside the power battery, and improves the utilization rate of the internal and external space of the power battery. The top cover for a power battery of the present invention can be used for primary batteries, secondary batteries and other types of batteries, as well as batteries for power, energy storage and other purposes.

Figure 4A:
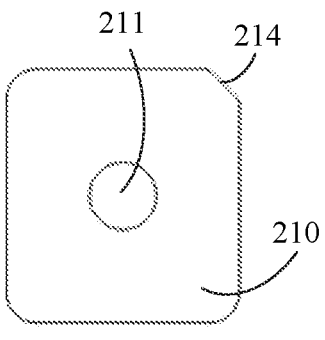
FIGS. 4A-4C are schematic diagrams of the shape of the first post 210 of the top cover for a power battery according to an embodiment of the present invention.
Figure 4B:
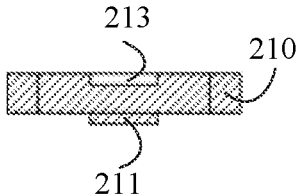
Figure 4C:
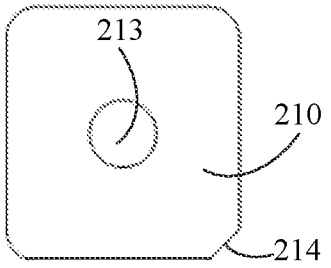

FIGS. 4A-4C are schematic diagrams of the shape of the first post 210 of the top cover for a power battery according to an embodiment of the present invention. FIG. 4A is a bottom view, and the shape of the first post 210 is a rectangle with rounded corners, and has a cut corner 214 in the upper right corner, and the circular first post protrusion 211 is located in the central part of the first post 210. Cut corners 214 facilitate orientation during installation. FIG. 4B is a side cross-sectional view from the same perspective as FIGS. 3A-3B. It can be seen from FIG. 4B that the top groove 213 and the first post protrusion 211 are oppositely disposed on two opposite surfaces of the first post 210. FIG. 4C is a top view, and it can be seen that the top groove 213 is located at the central part of the first post 210, and the cut corner 214 is located at the lower right corner in the figure.

Figure 5A:
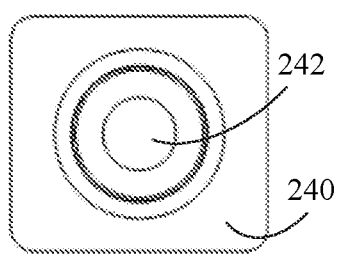
FIGS. 5A-5C are schematic diagrams of the shape of the second post 240 of the top cover for a power battery according to an embodiment of the present invention.
Figure 5B:
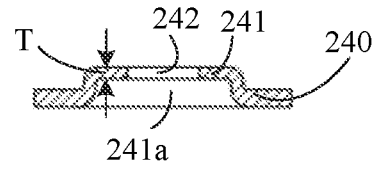
Figure 5C:
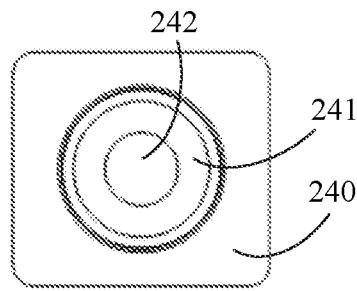

FIGS. 5A-5C are schematic diagrams of the shape of the second post 240 of the top cover for a power battery according to an embodiment of the present invention. FIG. 5A is a bottom view, and the outer shape of the second post 240 is a square with rounded corners, and the circular protrusion hole 242 is located at the center of the second post 240. FIG. 5B is a side cross-sectional view, and it can be seen that the second post protrusion 241 protrudes from the surface of the second post 240, and the protrusion hole 242 is located at the center of the second post protrusion 241. FIG. 5C is a top view, and it can be seen that the second post protrusion 241 is located at the center of the second post 240, and the protrusion hole 242 is located at the center of the second post protrusion 241.

In some embodiments, the inner part 241a of the second post protrusion 241 is hollow. As shown in FIG. 5B, the top thickness T of the second post protrusion 241 is 0.1-5 mm.

Figure 6A:
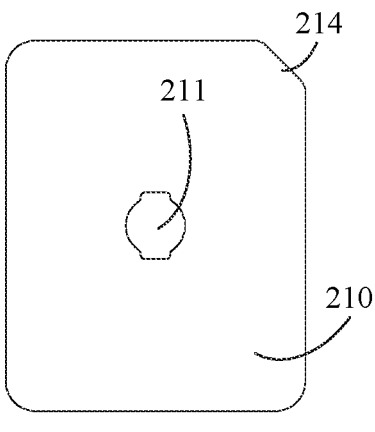
FIGS. 6A-6C are schematic diagrams of the shape of the first post 210 of the top cover for a power battery according to another embodiment of the present invention.
Figure 6B:
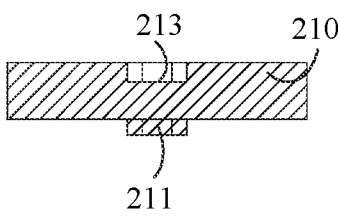
Figure 6C:
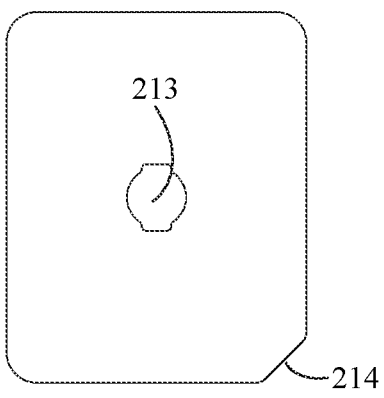

FIGS. 6A-6C are schematic diagrams of the shape of the first post 210 of the top cover for a power battery according to another embodiment of the present invention. FIG. 6A is a bottom view, FIG. 6B is a side cross-sectional view, and FIG. 6C is a top view. The difference between the first post 210 in this embodiment and the first post 210 shown in FIGS. 4A-4C is that the shapes of the first post protrusion 211 and the top groove 213 are different. Referring to FIGS. 6A-6C, both the first post protrusion 211 and the top groove 213 in this embodiment are substantially elliptical, and from the viewing angle as shown in FIGS. 6A and 6C, there possesses keyways protruding upward and downward.

Figure 7A:
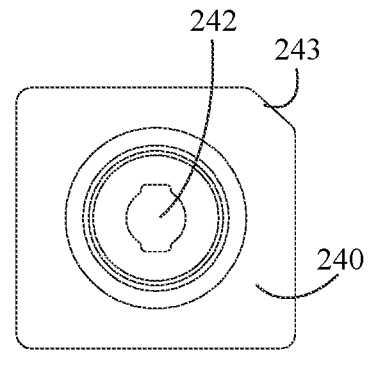
FIGS. 7A-7C are schematic diagrams of the shape of the second post 240 of the top cover for a power battery according to another embodiment of the present invention.
Figure 7B:
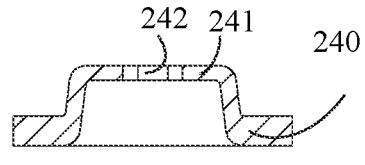
Figure 7C:
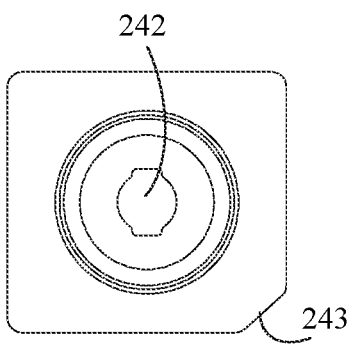

FIGS. 7A-7C are schematic diagrams of the shape of the second post 240 of the top cover for a power battery according to another embodiment of the present invention. FIG. 7A is a bottom view, FIG. 7B is a side cross-sectional view, and FIG. 7C is a top view. The difference between the second post 240 in this embodiment and the second post 240 shown in FIGS. 5A-5C is that the shape of the protrusion hole 242 is different, and the contour of the second post 240 further includes a cut corner 243. Referring to FIGS. 7A-7C, the protrusion hole 242 in this embodiment is generally oval in shape, and from the viewing angle as shown in FIGS. 6A and 6C, there have keyways that protrude upward and downward, which is in similar shape as the first post protrusion 211 and top groove 213 as shown in FIGS. 6A-6C.

Figure 8A:
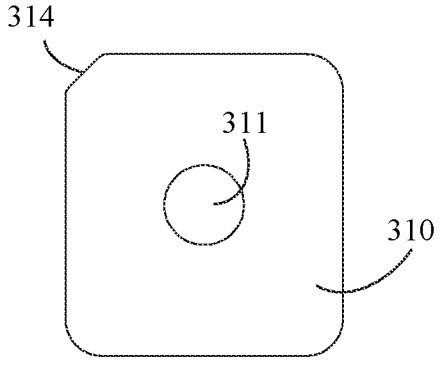
FIGS. 8A-8C are schematic diagrams of the shape of the first post 310 of the top cover for a power battery according to an embodiment of the present invention.
Figure 8B:
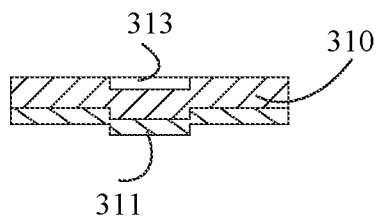
Figure 8C:
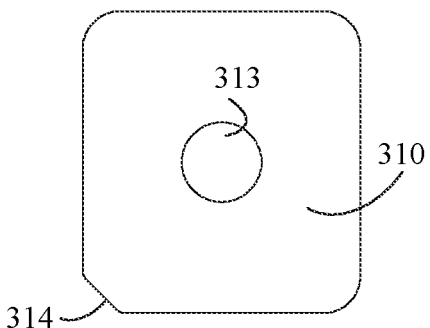

FIGS. 8A-8C are schematic diagrams of the shape of the first post 310 of the top cover for a power battery according to an embodiment of the present invention. The first post 310 is included in the post assembly 300, and the post assembly 300 can be used as the negative electrode of the power battery. FIG. 8A is a bottom view, and the shape of the first post 310 is a rectangle with rounded corners, and has a cut corner 314 in the upper left corner, and the circular first post protrusion 311 is located in the central part of the first post 310. Cut corner 314 facilitate orientation during installation. FIG. 8B is a side cross-sectional view from the same perspective as FIGS. 3A-3B. It can be seen from FIG. 8B that the top groove 313 and the first post protrusion 311 are oppositely disposed on two opposite surfaces of the first post 310. FIG. 8C is a top view, and it can be seen that the top groove 313 is located at the central part of the first post 310, and the cut corner 314 is located at the lower left corner in the figure.

Figure 9A:
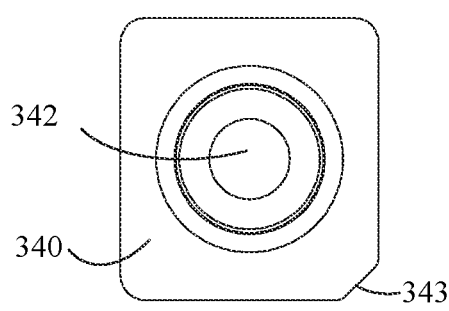
FIGS. 9A-9C are schematic diagrams of the shape of the second post 340 of the top cover for a power battery according to an embodiment of the present invention.
Figure 9B:
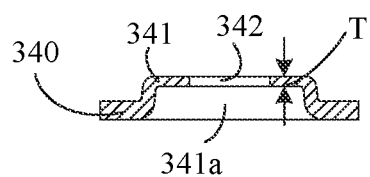
Figure 9C:
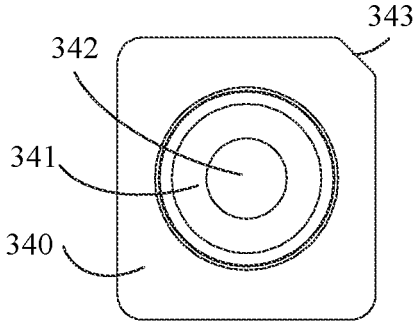

FIGS. 9A-9C are schematic diagrams of the shape of the second post 340 of the top cover for a power battery according to an embodiment of the present invention. FIG. 9A is a bottom view, the shape of the second post 340 is a square with rounded corners, and has a cut corner 343 at the lower right corner, and the circular protrusion hole 342 is located in the center of the second post 340. FIG. 9B is a side cross-sectional view, and it can be seen that the second post protrusion 341 protrudes from the surface of the second post 340, and the protrusion hole 342 is located at the center of the second post protrusion 341. FIG. 9C is a top view, it can be seen that the second post protrusion 341 is located at the center of the second post 340, the protrusion hole 342 is located at the center of the second post protrusion 341, and the cut corner 343 is located at the upper right corner in this figure.

In some embodiments, the inner part 341a of the second post protrusion 341 is hollow, as shown in FIG. 9B, the top thickness T of the second post protrusion 341 is 0.1-5 mm.

The inner parts 241a and 341a of the second post protrusion 241 and 341 adopt a hollow design, which can reduce the weight of the top cover for a power battery.

FIGS. 10A-10C are schematic diagrams of the shape of the first post 310 of the top cover for a power battery according to another embodiment of the present invention. FIG. 10A is a bottom view, FIG. 10B is a side cross-sectional view, and FIG. 10C is a top view. The difference between the first post 210 in this embodiment and the first post 310 shown in FIGS. 8A-8C is that the shape of the first post protrusion 311 and the top groove 313 are different, and the cut corner 314 as shown in FIG. 8A is located in the upper left corner. Referring to FIGS. 10A-10C, the first post protrusion 311 and the top grooves 313 in this embodiment are both substantially elliptical, and from the viewing angles shown in FIGS. 10A and 10C, there possesses upward and downward protrusion keyway.

FIGS. 11A-11C are schematic diagrams of the shape of the second post 340 of the top cover for a power battery according to another embodiment of the present invention. FIG. 11A is a bottom view, FIG. 11B is a side cross-sectional view, and FIG. 11C is a top view. The difference between the second post 340 in this embodiment and the second post 340 shown in FIGS. 9A-9C is that the shape of the protrusion hole 342 is different, and the cut corner 343 is located at the upper left corner in FIG. 11A. Referring to FIGS. 11A-11C, the protrusion hole 342 in this embodiment is generally oval in shape, and from the viewing angle shown in FIGS. 11A and 11C, there have keyways that protrude upward and downward, the same as in FIGS. 10A-10C. The first post protrusion 311 and top recesses 313 are shown in similar shapes.

Figure 12A:
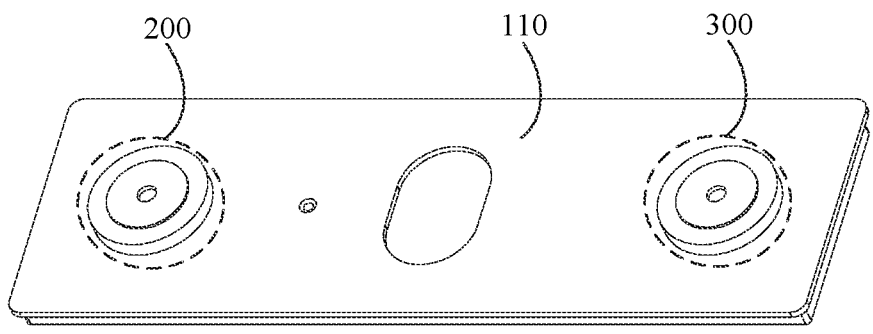
FIG. 12A is a perspective schematic view of a top cover for a power battery according to another embodiment of the present invention.
Figure 12B:
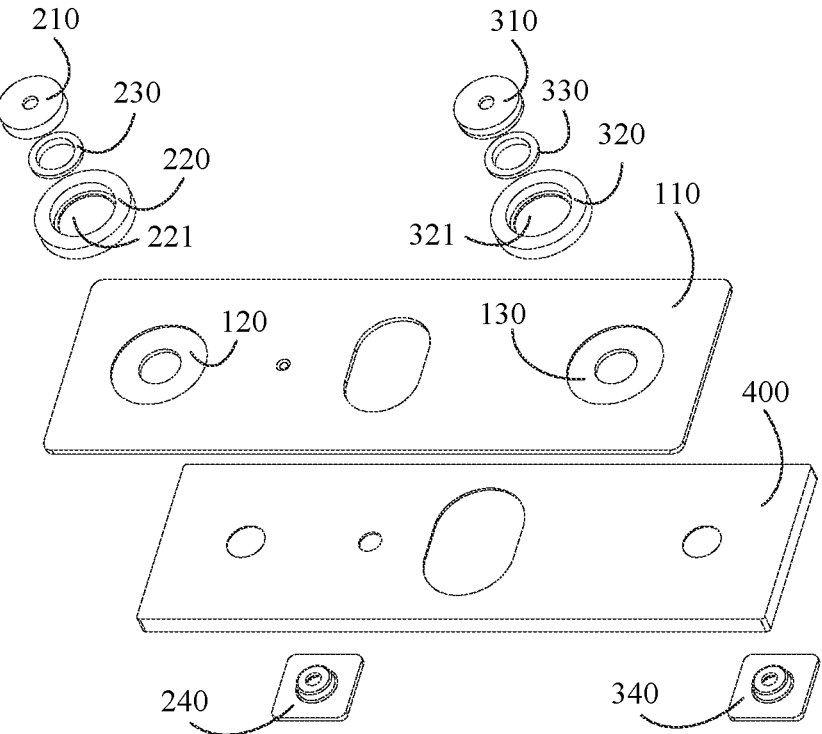
FIG. 12B is an exploded schematic diagram of a top cover for the power battery according to the embodiment shown in FIG. 12A.

FIG. 12A is a schematic perspective view of a top cover for a power battery according to another embodiment of the present invention. FIG. 12B is an exploded schematic view of the top cover for a power battery of the embodiment shown in FIG. 12A. In the embodiment as shown in FIGS. 12A and 12B, the first posts 210 and 310 are circular in shape, the first fasteners 220 and 320 are in circular shape, and the recessed platforms 120 and 130 are also circular in shape. In this embodiment, the first sealing members 230 and 330 and the first fasteners 220 and 320 are all annular. It should be noted that although the first sealing members 230 and 330 are located above the first fasteners 220 and 320 in FIG. 12B, the diameter of the outer ring of the first sealing members 230 and 330 is smaller than the diameter of the outer ring of the first fasteners 220 and 320. Therefore, after assembly, the first sealing members 230 and 330 are respectively located in the first fastener through holes 221 and 321 in the first fasteners 220 and 230.

Figure 13A:
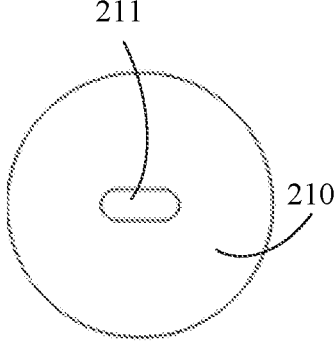
FIGS. 13A and 13B are structural schematic diagrams of the first post 210 of the top cover for a power battery according to another embodiment of the present invention.
Figure 13B:
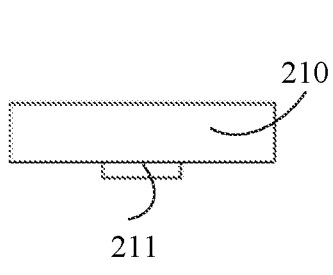

FIGS. 13A and 13B are schematic structural diagrams of the first post 210 of the top cover for a power battery according to another embodiment of the present invention. FIG. 13A is a bottom view, and FIG. 13B is a side view. In this embodiment, the first post protrusion 211 of the first post 210 is in the shape of a racetrack.

Figure 14A:
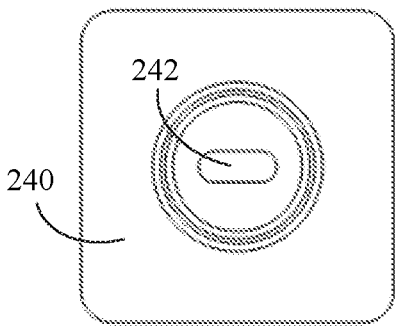
FIGS. 14A and 14B are structural schematic diagrams of the second post 240 of the top cover of a power battery according to another embodiment of the present invention.
Figure 14B:
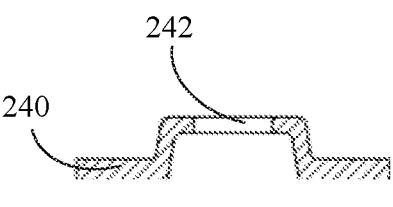

FIGS. 14A and 14B are schematic structural diagrams of the second post 240 of the top cover for a power battery according to another embodiment of the present invention.

FIG. 14A is a bottom view, and FIG. 14B is a side view. In this embodiment, the protrusion hole 242 in the second post 240 is in the shape of a racetrack, which can cooperate with the first post protrusion 211 in the embodiment shown in FIGS. 13A and 13B.

According to the embodiments shown in FIGS. 13A, 13B, 14A and 14B, the first post protrusion 211 and protrusion hole 242 that cooperate with each other are all racetrack-shaped, which can increase the welding track of the first post 210 and the second post 240, so as to improve the force strength and overcurrent capability of the post assemblies 200 and 300.

Figure 15:
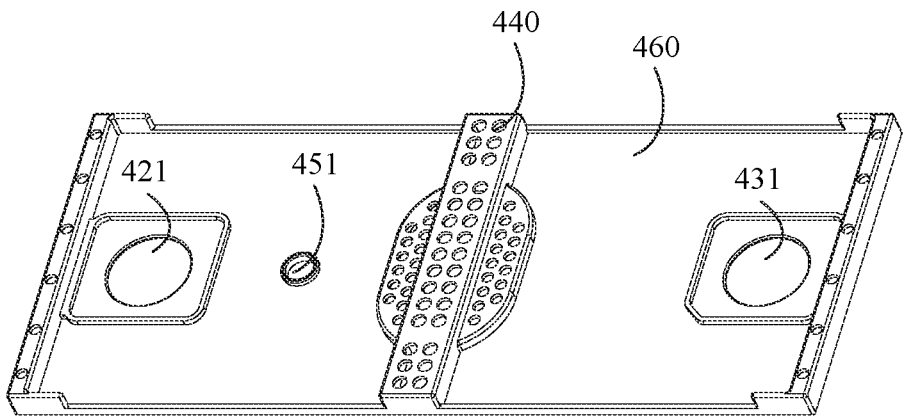
FIG. 15 is a schematic structural diagram of a bottom plate of the insulation plate of a top cover for a power battery according to an embodiment of the present invention.

FIG. 15 is a schematic structural diagram of an insulation plate bottom plate of a top cover for a power battery according to an embodiment of the present invention. As shown in FIG. 2 and FIG. 15, the insulation plate bottom plate 460 is located at the bottom of the insulation plate 440. The bottom plate 460 includes an explosion-proof valve hole 440 and a liquid injection hole 451. The explosion-proof valve hole 440 includes a porous structure. The bottom plate 460 also includes insulation plate through holes 421 and 431. In the embodiment shown in FIG. 2, there is also a flat plate on the upper surface of the insulation plate bottom plate 460, and the insulation plate through holes 420, 430 and the liquid injection hole 450 are actually located on the flat plate. The insulation plate through holes 421, 431 and the liquid injection hole 451 on the insulation plate bottom plate 460 shown in FIG. 15 correspond to the insulation plate through holes 420, 430 and the liquid injection hole 450 respectively.

Figure 16:
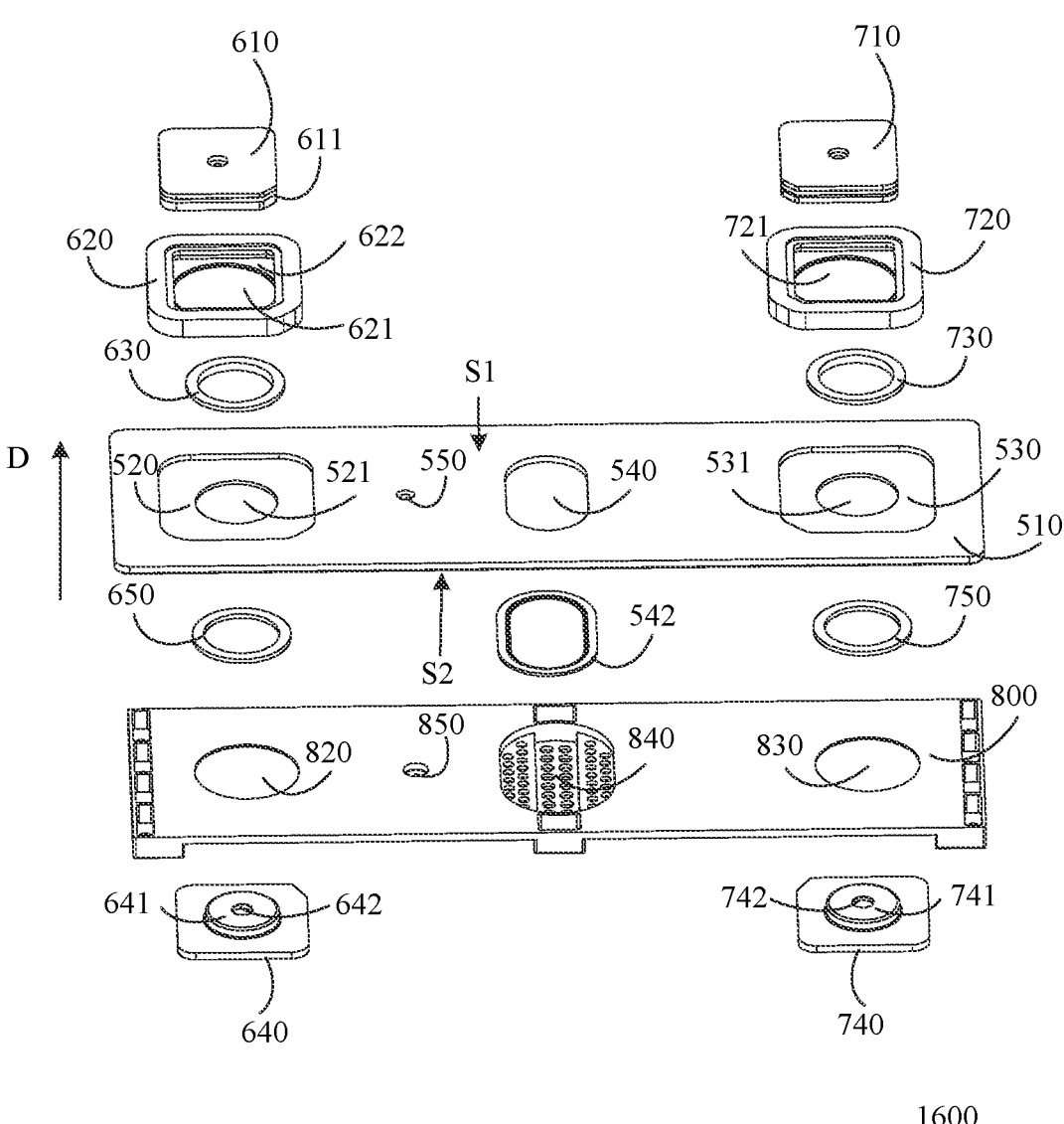
FIG. 16 is an exploded schematic diagram of a top cover for a power battery according to another embodiment of the present invention.

FIG. 16 is an exploded schematic diagram of a top cover for power battery according to another embodiment of the present invention. Referring to FIG. 16, the power battery top cover 1600 of this embodiment includes the top cover plate 510, the insulation plate 800, the post assembly 600 composed of the first post 610, the first fastener 620, the second post 640, the first sealing member 630 and the second sealing member 650, and the post assembly 700 composed of the first post 710, the first fastener 720, the second post 740, the first sealing member 730 and the second sealing member 750.

In this embodiment, the top cover plate 510 includes post recessed platforms 520 and 530 and post holes 521 and 531. The post recessed platforms 520 and 530 are recessed in the first surface S1 of the top cover plate 510. The post holes 521 and 531 are located in the post recessed platforms 520 and 530.

The main structures of the post assemblies 600 and 700 are the same. Taking the post assembly 600 as an example, in the embodiment shown in FIG. 16, the first post 610 includes a first post protrusion (not shown), and the first post protrusion passes through the post hole 521 in the top cover plate 510. From the viewing angle shown in FIG. 16, the first post protrusion is protrudingly disposed on the lower surface of the first post 610.

The first fastener 620 includes a first fastener through hole 621, the first post 610 is partially disposed in the first fastener through hole 621, and the first fastener 620 is partially disposed in the post recessed platform 520.

The second post 640 includes a second post protrusion 641, the second post protrusion 641 includes a protrusion hole 642, in the assembled power battery top cover 1600, the first post protrusion protrudes into the protrusion hole 642, and the first post 610 and the second post 640 are in electrical contact.

The first sealing member 630 is disposed in the post recessed platform 520 and is in contact with the first post 610.

The insulation plate 800 includes insulation plate through holes 820 and 830, wherein the insulation plate through hole 820 corresponds to the post assembly 600, and the insulation plate through hole 830 corresponds to the post assembly 700. Taking the insulation plate through hole 820 as an example, the position, size and shape of the insulation plate through hole 820 on the insulation plate 800 should be compatible with the post hole 621, the first post protrusion, and the second post protrusion 641, so that the second post protrusion 641 is electrically connected to the first post 610 through the insulation plate through hole 820. The insulation plate 800 is disposed on the side of the second surface S2 of the top cover plate 510.

Most of the structures in the embodiment of FIG. 16 are the same as those of the embodiment shown in FIG. 2, and the same content will not be repeated. FIGS. 2 to 15 and the corresponding description contents can be used to describe the embodiment shown in FIG. 16.

Referring to FIG. 16, the first post 610 of this embodiment further includes a groove 611, and the groove 611 is located at the waist position of the first post 610; the first fastener 620 further includes a bulge 622, and the bulge 622 is located at the waist position of the first post 610. At the waist position of the first fastener 620, the bulge 622 is inserted into the groove 611.

In some embodiments, the first post 610 and the first fastener 620 are integrally injection-molded or assembled. According to these embodiments, when assembling the top cover 1600 for a power battery, the first post 610 and the first fastener 620 are firstly fixed by means of integral injection molding or assembly connection, and then the fixed first post 610 and the first fastener 620 are put into the post recessed platform 520. The first post 610 and the first fastener 620 have simple structures, save space, and have good sealing performance.

In some embodiments, the first post 610 is a conductive material, and the material of the first post 610 and the material of the first fastener 620 are different. When the post assembly 600 is used as the positive electrode for a power battery, the material of the first fastener 620 may be a conductive material or an insulation material. When the illustrated first fastener 620 is made of conductive material, the material thereof is different from that of the first post 610.

In the embodiment shown in FIG. 16, the power battery top cover 1600 further includes a second sealing member 650, at least partially sandwiched between the second post 640 and the second surface S2.

Figure 17A:
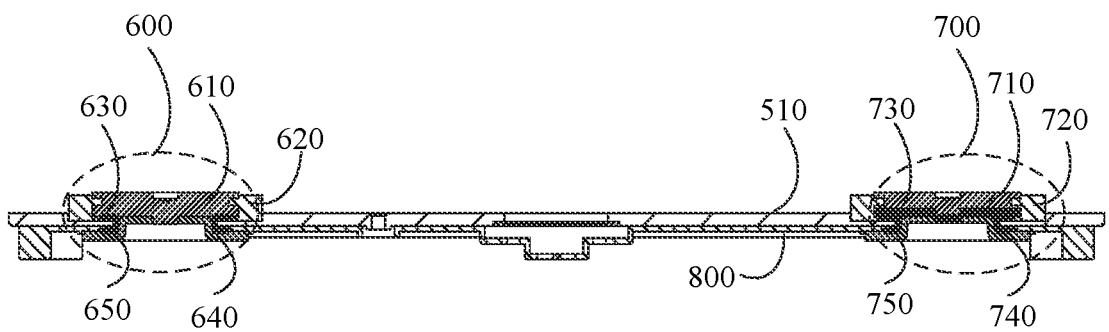
FIGS. 17A-17C are schematic cross-sectional views of a top cover for a power battery according to an embodiment of the present invention.
Figure 17B:
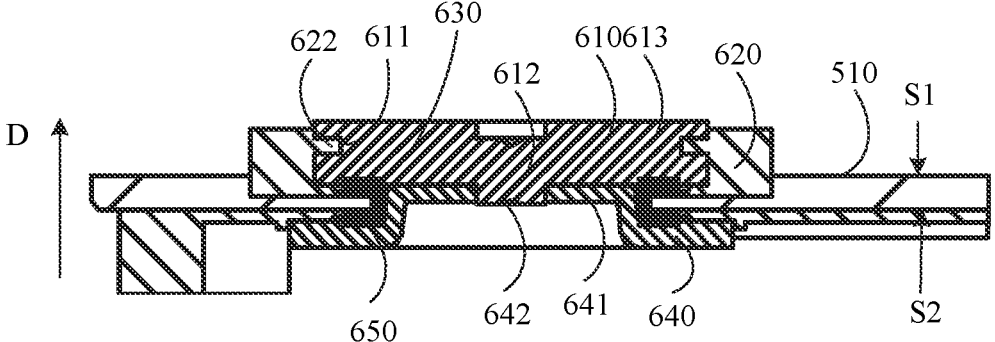
Figure 17C:
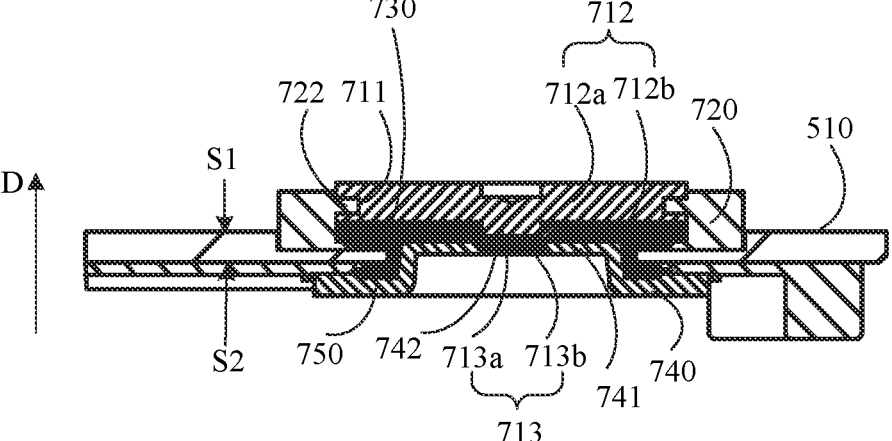

FIGS. 17A-17C are schematic cross-sectional views of a power battery top cover according to an embodiment of the present invention. FIGS. 17A-17C are from the same perspective as FIGS. 3A-3C. FIG. 17A is a schematic cross-sectional view of a power battery top cover 1600, which includes a top cover plate 510, electrode groups 600, 700 and an insulation plate 800. The post assembly 600 includes a first post 610, a first fastener 620, a second post 640, a first sealing member 630 and a second sealing member 650; the post assembly 700 includes a first post 710, the first fastener 720, the second post 740, the first sealing member 730 and the second sealing member 750.

FIG. 17B is a partially enlarged schematic view including the post assembly 600 in FIG. 17A. Referring to FIG. 17B, in normal use, the first post 610 has a certain height along the direction D, and the groove 611 is located at the waist position of the first post 610, that is, the groove 611 is located in the middle of the height direction of the first post 610. Correspondingly, the bulge 622 of the first fastener 620 is also located at the waist of the first fastener 620, and the position, size and shape of the bulge 622 are adapted to the groove 611, so that the bulge 622 can be embedded in the recessed groove 611. In the groove 611, the first post 610 and the first fastener 620 form a structure in close contact. The first post protrusion 612 of the first post 610 protrudes into the protrusion hole 642 of the second post protrusion 641.

Referring to FIG. 17B, the position, size and structure of the first sealing member 630 are similar to those of the first sealing member 230 in the embodiment shown in FIG. 3B. In the embodiment shown in FIG. 17B, the second sealing member 650 is at least partially sandwiched between the second post 640 and the second surface S2.

In some embodiments, when the post assembly 600 is used for the positive electrode for a power battery, the material of the first post 610 and the second post 640 may be aluminum material or aluminum alloy material.

FIG. 17C is a partially enlarged schematic view including the post assembly 700 in FIG. 17A. Referring to FIG. 17C, in the waist position of the first post 710 there has a groove 711, and in the waist position of the first fastener 720 there has a protrusion 722. Similar to the post assembly 600, the protrusion 722 is embedded in the groove 711, so that the first post 710 and the first fastener 720 form a structure in close contact.

The second sealing member 750 in the post assembly 700 shown in FIG. 17C is similar to the second sealing member 650 in the post assembly 600. The difference between the post assembly 700 and the post assembly 600 is that the post body 712 of the first post 710 is divided into two parts along the direction D, namely the upper part 712a and the lower part 712b, and the two parts have protrusions respectively. Therefore, the first post protrusion 713 is also divided into two parts, which are an upper protrusion 713a and a lower protrusion 713b. The upper part 712a and the lower part 712b can be integrally formed, or can be formed by combining two separate parts. The lower protrusion 713b protrudes into the protrusion hole 742 in the second post protrusion 741 of the second post 740.

In some embodiments, when the post assembly 700 is used for the negative electrode for a power battery, the material of the first post 710 may be a copper-aluminum composite material, wherein the material of the upper part 712a may be aluminum or aluminum alloy, and the material of the lower part 712b can be copper material or copper alloy material; the material of the second post 740 can be copper material or copper alloy material. The material of the first fastener 720 may be a plastic material with good corrosion resistance and high temperature resistance. The material of the first sealing member 730 may be a rubber material with certain elasticity.

The power battery top cover 1600 of the present invention cooperates with each other through the groove of the first post and the bulge of the first fastener, and can connect the first post and the first fastener by injection molding. The structure is simple and stable, and has better sealing performance.

FIGS. 18A-18D are four embodiments of the first sealing member and the second sealing member for a power battery top cover of the present invention. FIGS. 18A-18D can be used as partial enlarged schematic views of the structure including the first sealing member 630 and the second sealing member 650 in FIG. 17B, in which elements other than the first sealing member 630 and the second sealing member 650 are omitted. FIGS. 18A-18D can also be used as partial enlarged schematic views of the structure including the first sealing member 730 and the second sealing member 750 in FIG. 17C. In FIGS. 18A-18D, the first sealing member 630 and the second sealing member 650 are used as examples for description, and the same applies to the description of the first sealing member 730 and the second sealing member 750.

In the embodiment shown in FIG. 18A, the first sealing member 630 includes a first part 630a and a second part 630b, and as shown in FIG. 17B, the first part 630a is sandwiched between the first post 610 and the post recessed platform 620, the second part 630b is arranged in the post hole 621, and the second part 630b is sandwiched between the post recessed platform 620 and the second post protrusion 641. As shown in FIG. 17B, the upper surface of the first part 630a is in contact with the lower surface of the post body 613, the lower surface of the first part 630a is in contact with the upper surface of the post recessed platform 720; the upper surface of the second part 630b is also in contact with the lower surface of the post body 613, the outer side of the second part 630b is in contact with the sidewall of the post recessed platform 620 extending downward to the second surface S2, and the inner side of the second part 630b is in full contact, partial contact or no contact with the second post protrusion 642.

In the embodiment shown in FIG. 18A, the first part 630a and the second part 630b are L-shaped in their longitudinal section, and the inverted L-shape shown in FIG. 18A indicates that the first sealing member 630 is of an annular structure with raised ribs, and the first part 630a is an annular rib.

In the embodiment shown in FIG. 18A, the longitudinal cross-section of the second sealing member 650 is in-line, indicating that it is annular. Referring to FIG. 17B, the second sealing member 650 is sandwiched between the second post 640 and the second surface S2, the upper surface of the second sealing member 650 along the direction D is in contact with the second surface S2, the lower surface of the second sealing member 650 is in contact with the upper surface of the second post 640, and the inner sidewall of the second sealing member 650 is in contact with or not in contact with the outer sidewall of the second post protrusion 641.

In the embodiment as shown in FIG. 18B, on the basis of that shown in FIG. 18A, the longitudinal section of the first sealing member 630 is an inverted L-shape, and the length of the second part 630b along the direction D is longer than the length of the second part 630b in FIG. 18A. Correspondingly, the longitudinal section of the second sealing member 650 is in-line, and its length parallel to the second surface S2 is shorter than that of the second sealing member 650 in FIG. 18A. As shown in FIG. 17B, the inner sidewall of the second sealing member 650 is in contact with the second part 630b of the first sealing member 630.

Figure 18C:
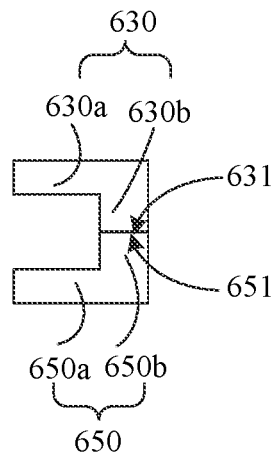

In the embodiment shown in FIG. 18C, the longitudinal section of the first sealing member 630 is L-shaped, including a first part 630a and a second part 630b. The second sealing member 650 includes a third part 650a and a fourth part 650b. It can be understood that the third and fourth in this context are only different from the names of the first and the second, and do not mean that the second sealing member 650 includes four parts. Referring to FIG. 17B, the third part 650a is sandwiched between the second post 640 and the second surface S2, the fourth part 650b is arranged in the post hole 621, and the fourth part 650b is sandwiched between the post recessed platform 620 and the second post protrusion 641. As shown in FIG. 17B, the upper surface of the third part 650*a* is in contact with the second surface S2, the lower surface of the third part 650*a* is in contact with the upper surface of the second post 640; the outer side of the fourth part 650*b* is in contact with the sidewall of the post recessed platform 620 extending downward to the second surface S2, and the inner side of the fourth part 650*b* is in full contact, partial contact, or no contact to the second post protrusion 642.

In the embodiment shown in FIG. 18C, the third part 650*a* and the fourth part 650*b* are L-shaped in their longitudinal section.

Figure 18D:
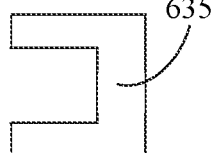

In the embodiment shown in FIG. 18D, the first sealing member 630 and the second sealing member 650 are integrally formed, forming one sealing member 635. The outer shape of the sealing member 635 is the same as the overall outer shape of the combined first sealing member 630 and the second sealing member 650 as shown in FIGS. 18A-18C.

In some embodiments, the first sealing member 630 and the second sealing member 650 are in contact with each other. Referring to FIGS. 18A and 18B, the second part 630*b* of the first sealing member 630 and the second sealing member 650 are in close contact. In the embodiment as shown in FIG. 18C, the second part 630*b* of the first sealing member 630 and the fourth part 650*b* of the second sealing member 650 are in close contact.

Referring to FIGS. 17B and 18C, in some embodiments, the first sealing member 630 includes a fifth part 630*b* sandwiched between the post recessed platform 620 and the second post protrusion 641, and the second sealing member 650 includes the sixth part 650*b* sandwiched between the post recessed platform 620 and the second post protrusion 641, the fifth part 630*b* includes a first end 631 parallel to the first surface S1, and the sixth part 650*b* includes a second end 651 parallel to the first surface S1, the first end 631 abuts against the second end 651. The fifth part 630*b* here is the second part 630*b* of the first sealing member 630, and the sixth part 650*b* is the fourth part 650*b* of the second sealing member 650.

FIGS. 18A-18D are only examples, and are not used to limit the specific structures of the first sealing member 630 and the second sealing member 650. Any deformations based on the embodiments shown in FIGS. 18A-18D are within the scope of the present invention.

The power battery top cover of the present invention adopts a first sealing member and a second sealing member to form a double sealing structure for the post assembly, which greatly improves the reliability of the post sealing; and the first post and the second post adopt welding connection, the force generated during the welding process is directly transmitted to the first sealing member and the second sealing member; the welding force is consistent with the direction of the compressive force of the first sealing member and the second sealing member, which is beneficial to the compression of the first sealing member and the second sealing member that further enhances the sealing of the post. The power battery top cover has good sealing performance, pressure resistance and high temperature resistance.

The present invention also includes a power battery, including the power battery top cover of the embodiments of the present invention.

Figure 19:
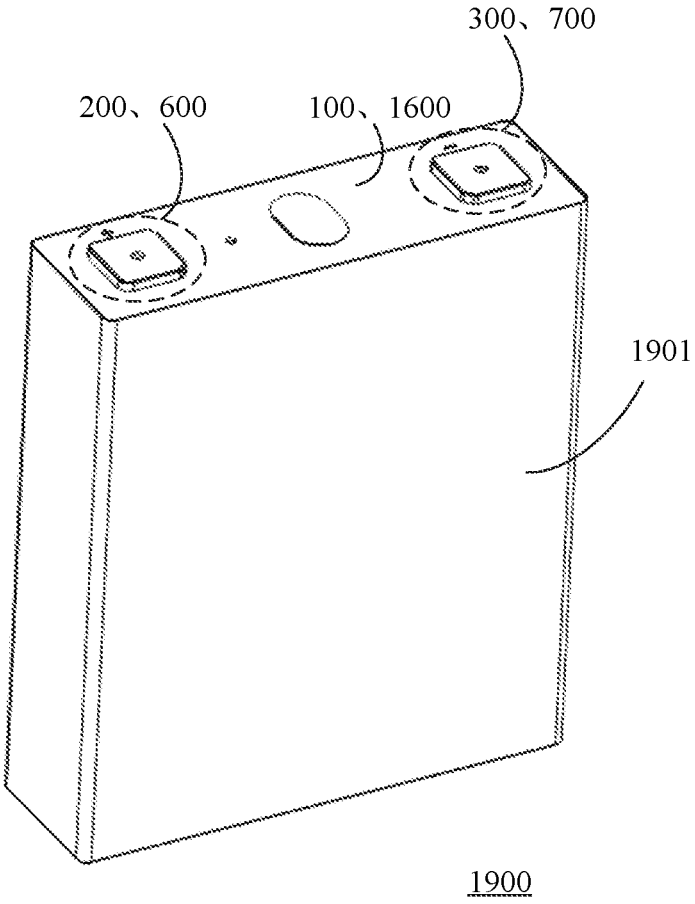
FIG. 19 is a schematic structural diagram of a power battery according to an embodiment of the present invention.

FIG. 19 is a schematic structural diagram of a power battery according to an embodiment of the present invention. The power battery 1900 includes the power battery top cover and the battery body 1901 of the present invention.

The power battery top cover can be the power battery top cover 100 or 1600 described above, wherein the post assemblies 200 and 600 can be used as the positive electrode for a power battery 1900, and the post assemblies 300 and 700 can be used as the negative electrode for a power battery 1900.

In some embodiments, the power battery of the present invention is a lithium-ion battery.

Due to the use of the power battery top cover of the present invention, the power battery 1900 also has good sealing, pressure resistance and high temperature resistance, which is safe and reliable.

The invention claimed is:

1. A top cover for a power battery, characterized in comprising:
    a top cover plate, comprising a recessed platform for a post and a post hole, the recessed platform for a post being provided in a first surface of the top cover plate in a depressed manner, and the post hole being located in the recessed platform;
    a first post, comprising a first post protrusion passing through the post hole;
    a first fastener, comprising a first fastener through hole, the first post being partially disposed within the first fastener through hole, and the first fastener being partially disposed within the recessed platform;
    a second post, comprising a second post protrusion, the second post protrusion comprising a protrusion hole, the first post protrusion extending into the protrusion hole, and the first post being in electrical contact with the second post, wherein a lower surface of a post body of the first post being in electrical contact with an upper surface of the second post protrusion, and wherein one or more weldings are added between the contact surfaces of the lower surface of the post body of the first post and the upper surface of the second post protrusion of the second post;
    a first sealing member, disposed within the recessed platform and being in contact with the first post; and
    an insulation plate, comprising an insulation plate through hole and provided at a side of a second surface of the top cover plate, the second surface being a reverse side surface of the first surface, and the second post protrusion passing through the insulation plate through hole and being in electrical contact with the first post.

2. The top cover of a power battery according to claim 1, wherein the first post protrusion and the protrusion hole are connected through welding.

3. The top cover of a power battery according to claim 1, wherein the first post further comprises a groove, and the groove is located at a waist position of the first post; the first fastener further comprises a bulge, and the bulge is located at a waist position of the first fastener, and the bulge is embedded in the groove.

4. The top cover for a power battery according to claim 3, wherein the first post and the first fastener are integrally injection-molded or assembled.

5. The top cover for a power battery according to claim 1, wherein the first post is a conductive material, and the material of the first post is different from the material of the first fastener.

6. The top cover for a power battery according to claim 1, wherein the first sealing member is an annular structure, and an annular area of the first sealing member is smaller than a hole area of the first fastener through hole.

7. The top cover for a power battery of claim 1, wherein the first sealing member comprises a first part and a second

| part, and the first part is sandwiched between the first post and the recessed platform for a post, the second part is arranged in the post hole, and the second part is sandwiched between the recessed platform for a post and the second post protrusion.

8. The top cover for a power battery according to claim 7, wherein a combination of the first part and the second part are L-shaped in their longitudinal section.

9. The top cover for a power battery of claim 1, further comprising:

a second sealing member, and the second sealing member is at least partially sandwiched between the second post and the second surface.

10. The top cover for a power battery according to claim 9, wherein the second sealing member is an annular structure, and an annular area of the second sealing member is smaller than a hole area of the insulation plate through hole.

11. The top cover for a power battery according to claim 9, wherein the second sealing member comprises a third part and a fourth part, the third part is sandwiched between the second post and the second surface, the fourth part is arranged in the post hole, and the fourth part is sandwiched between the recessed platform for a post and the second post protrusion.

12. The top cover for a power battery according to claim 11, wherein a combination of the third part and the fourth part are L-shaped in their longitudinal section.

13. The top cover for a power battery of claim 9, wherein the first sealing member and the second sealing member are in contact with each other.

14. The top cover for a power battery according to claim 13, wherein the first sealing member comprises a fifth part sandwiched between the recessed platform for a post and the second post protrusion, the second sealing member comprises a sixth part sandwiched between the recessed platform for a post and the second post protrusion, the fifth part comprises a first end parallel to the first surface, the sixth part comprises a second end parallel to the first surface, and the first end abuts with the second end.

15. The top cover for a power battery according to claim 9, wherein the first sealing member and the second sealing member are integrally injection-molded.

16. The top cover for a power battery according to claim 1, wherein when the first post and the second post cooperate as a positive electrode of a power battery, the first fastener is a conductive material or insulation material.

17. The top cover for a power battery according to claim 1, wherein when the first post and the second post cooperate as a negative electrode of a power battery, the first fastener is an insulation material.

18. The top cover for a power battery according to claim 1, wherein the top cover plate comprises two symmetrically distributed recessed platforms for a post, and each of the recessed platform for a post comprises one post hole, two sets of the first post, the first fastener, the second post, and the first sealing member are respectively arranged corresponding to the two recessed platforms for a post and the post hole, wherein one set of the first post and the second post being as a positive electrode of the power battery, and the other set of the first post and the second post being as a negative electrode of the power battery.

19. The top cover for a power battery according to claim 1, wherein inside of the second post protrusion is hollow.

20. The top cover for a power battery according to claim 1, wherein a shape of the first post protrusion is polygon, circle, ellipse or racetrack shape, a shape of the protrusion hole is polygon, circle, ellipse or racetrack shape, and shapes of the first post protrusion and the protrusion hole are matched.

21. A power battery, characterized in that, comprising the top cover for a power battery as claimed in claim 1.

* * * * *